US012415924B2

United States Patent
Schlumpf et al.

(10) Patent No.: US 12,415,924 B2
(45) Date of Patent: Sep. 16, 2025

(54) FAST CURING TWO-COMPONENT SILICONE COMPOSITION HAVING ADJUSTABLE POT LIFE

(71) Applicant: SIKA TECHNOLOGY AG, Baar (CH)

(72) Inventors: Michael Schlumpf, Stallikon (CH); Riccardo Suter, Baden (CH); Samuel Jakob, Dietikon (CH)

(73) Assignee: SIKA TECHNOLOGY AG, Baar (CH)

( * ) Notice: Subject to any disclaimer, the term of this patent is extended or adjusted under 35 U.S.C. 154(b) by 417 days.

(21) Appl. No.: 17/786,808

(22) PCT Filed: Jan. 20, 2021

(86) PCT No.: PCT/EP2021/051176
§ 371 (c)(1),
(2) Date: Jun. 17, 2022

(87) PCT Pub. No.: WO2021/156055
PCT Pub. Date: Aug. 12, 2021

(65) Prior Publication Data
US 2023/0044204 A1 Feb. 9, 2023

(30) Foreign Application Priority Data
Feb. 3, 2020 (EP) .................. 20155227

(51) Int. Cl.
*C08L 83/06* (2006.01)
*C08G 77/16* (2006.01)

(52) U.S. Cl.
CPC .......... *C08L 83/06* (2013.01); *C08G 77/16* (2013.01); *C08G 2150/00* (2013.01); *C08G 2170/00* (2013.01); *C08G 2190/00* (2013.01)

(58) Field of Classification Search
CPC ............................ C08L 83/04; C08L 83/06
USPC ............ 528/34, 17, 18, 38; 106/287.11
See application file for complete search history.

(56) References Cited

U.S. PATENT DOCUMENTS

| | | | |
|---|---|---|---|
| 4,962,152 A | 10/1990 | Leempoel | |
| 5,290,826 A * | 3/1994 | Palmer | C08L 83/04 523/205 |
| 5,405,889 A * | 4/1995 | Hatanaka | C08L 83/04 523/210 |
| 6,395,855 B1 | 5/2002 | Luft et al. | |
| 6,506,279 B1 | 1/2003 | Luft et al. | |
| 2003/0051610 A1 | 3/2003 | Dux et al. | |
| 2006/0155045 A1 | 7/2006 | Tsuno et al. | |
| 2010/0081751 A1 | 4/2010 | Blanc-Magnard et al. | |
| 2015/0240057 A1* | 8/2015 | Kumar | C08K 9/04 524/764 |
| 2018/0127582 A1* | 5/2018 | Verosky | F16J 15/14 |
| 2020/0339811 A1* | 10/2020 | Verosky | C08L 83/06 |

FOREIGN PATENT DOCUMENTS

| | | |
|---|---|---|
| CN | 109135660 A | 1/2019 |
| DE | 3889035 T2 | 8/1994 |
| DE | 19832686 A1 | 2/2000 |
| DE | 19832688 A1 | 2/2000 |
| EP | 0 787 766 A1 | 8/1997 |
| WO | 2007/096355 A1 | 8/2007 |

OTHER PUBLICATIONS

XP002799898, Thomson Scientific, London, GB, vol. 2019, No. 20, AN 2019-05638A, Retrieved from: Database WPI.
XP002799899, Thomson Scientific, London, GB, vol. 2017, No. 48, AN 2017-37329W, Retrieved from: Database WPI.
Apr. 23, 2021 International Search Report issued in International Patent Application No. PCT/EP2021/051176.
Jul. 28, 2022 International Preliminary Report on Patentability issued in International Patent Application No. PCT/EP2021/051176.

* cited by examiner

*Primary Examiner* — Margaret G Moore
(74) *Attorney, Agent, or Firm* — Oliff PLC

(57) ABSTRACT

A two-component silicone composition made of a component A including a hydroxyl-group terminated polydiorganosiloxane P; between 0.05-5.0 wt. % water, relative to component A; and component B including a non-condensable polydiorganosiloxane; a catalyst K cross-linking polydiorganosiloxanes; between 0-50 wt. % of a first organosilane V1 according to formula (I), between 2-60 wt. % of a second organosilane V2 according to formula (II), up to 25 wt. % of organosilanes V3 having hydrolyzable alkoxysilane groups Si—ORa not falling under the formulae (I) and (II), with Ra being a hydrogen atom or monovalent, linear or branched alkyl group with 1-6 carbon atoms, Rb being a divalent, linear or branched alkyl group or alkenyl group with 2-20 carbon atoms, and Rc being a divalent, linear or branched alkyl group with 2-20 carbon atoms containing a secondary amino group; the composition containing less than 10 mole-%, relative to the amount of organosilane V2, of organosilanes with epoxy groups.

13 Claims, No Drawings

FAST CURING TWO-COMPONENT SILICONE COMPOSITION HAVING ADJUSTABLE POT LIFE

TECHNICAL FIELD

The present invention relates to the field of two-component silicone compositions.

STATE OF THE ART

Two-component silicone compositions have already long been known and are used particularly as adhesives and sealants in different applications. Products in wide use are in particular two-component silicone compositions that crosslink at room temperature, also known as RTV-2 silicones (RTV-2: "room temperature vulcanizing, 2-part silicones").

Such a two-component silicone composition is described, for example, in EP 0 787 766 A1. A further two-component silicone composition is described in US 2015/240057 A1. In order not to impair storage stability in these two documents described compositions, or to prevent premature unwanted curing, the main constituents, namely an α, ω-dihydroxy-polydiorganosiloxane and a catalyst and a crosslinker for the crosslinking of polydiorganosiloxanes, are stored in two separate components. In the application of such a composition, the two components are then mixed with one another in an intended weight or volume ratio, which is important for crosslinking or for curing of the composition. The time during which the mixture is still processible and applicable before the curing has advanced too far is referred to as pot life. A significant drawback of such two-component silicone compositions, as described in EP 0 787 766 A1 or US 2015/240057 A1, is the constancy of pot life. This is determined by the formulation of the two-component silicone composition, but in particular via the type and amount of reactive substances present, such as crosslinkers, and via the amount of catalyst. It is typically possible here to achieve two-component silicone compositions having short pot life and rapid curing, or else long pot life and slow curing. All these compositions additionally have typical curing characteristics, which are associated with crosslinking that is slow or rapid, but constant from the start, and hence increasing the viscosity after mixing of the components. This is a problem in industrial manufacture in particular. What would be desired therein would be a pot life tailored to the process without waiting periods, but then with very rapid curing of the composition after application, in order that the parts thus manufactured can be moved onward rapidly. In the case of very short pot lives, another problem is that the mixture begins to cure too early and hence causes rejects and undesirable cleaning operations. In the case of excessively long pot lives followed by slow curing, cycle times in manufacturing are increased by waiting periods, which is likewise undesirable. Depending on the process, it is possible to adapt the pot life of a two-component silicone composition to the process. However, this requires a carefully adjusted formulation of the components of the two-component silicone composition, which is complex and in turn results in a constant pot life adapted solely to one process. This is often not economically possible in flexible production processes or with small numbers of items.

There is therefore a need for a two-component silicone composition where the pot life can be adjusted within a particular range by simple means even only on application. Furthermore, the composition, irrespective of the pot life chosen, is to cure very rapidly after the end of the pot life and is always to have the same mechanical properties after curing. Moreover, the rise in viscosity of the mixture directly after mixing is to be very small, in order that good machine applicability is possible, but curing is to advance very rapidly after the end of the pot life, in order that the manufactured parts with the composition applied can be moved onward as rapidly as possible.

SUMMARY OF THE INVENTION

It is therefore an object of the present invention to provide a two-component silicone composition that overcomes the disadvantages of the prior art and has a pot life adjustable directly on application, wherein the composition is to have a very small rise in viscosity after mixing and during its pot life and cures very rapidly in each case after the end of the pot life. Furthermore, the composition, irrespective of the pot life established, is to have largely identical mechanical properties in each case after curing.

It has been found that, surprisingly, this object is achieved by two-component silicone compositions as claimed in claim 1.

By virtue of the use of a combination of specific organosilanes as crosslinkers, which is in no way obvious to the person skilled in the art, it is possible to provide two-component silicone compositions that have an adjustable pot life, with adjustability of the range within which the pot life can be established solely via the mixing ratio of the two components of the two-component silicone composition. The mechanical properties of the composition after curing are surprisingly barely affected by the variation of the mixing ratio. It is thus possible, according to the present invention, to formulate two-component silicone compositions that have a pot life adjustable within particular limits but, after the end of the pot life, show unusually rapid, uniform curing. The two-component silicone compositions of the invention are therefore of particularly good suitability for automated application in industrial manufacture and can, if required, be adjusted flexibly to varying processes that are different in terms of pot life requirement.

Further aspects of the invention are the subject of further independent claims. Particularly preferred embodiments of the invention are the subject of the dependent claims.

Ways of Executing the Invention

The present invention provides a two-component silicone composition consisting of a component A comprising
i) at least one hydroxyl group-terminated polydiorganosiloxane P;
ii) between 0.05% and 5.0% by weight of water, based on component A;
and a component B comprising
i) at least one noncondensable polydiorganosiloxane as plasticizer;
ii) at least one catalyst K for the crosslinking of polydiorganosiloxanes;
iii) between 0% and 50% by weight, based on component B, of at least one first organosilane V1 of formula (I)

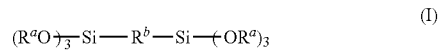

(I)

iv) between 2% and 60% by weight, based on component B, of at least one second organosilane V2 of formula (II)

$$(R^aO)_{\overline{3}}Si-R^c-Si(OR^a)_3 \quad (II)$$

v) between 0% and 25% by weight, based on component B, of further organosilanes V3 having hydrolyzable alkoxysilane groups Si—$OR^a$ that are not covered by the formulae (I) and (II), where $R^a$ is a hydrogen atom or a monovalent linear or branched alkyl radical having 1 to 6 carbon atoms, $R^b$ is a divalent linear or branched alkyl radical or alkenyl radical having 2 to 20 carbon atoms, and $R^c$ is a divalent linear or branched alkyl radical which has 2 to 20 carbon atoms and contains at least one secondary amino group and optionally a hydroxyl group and an ether oxygen;

with the proviso that the composition contains less than 10 mol %, based on the amount of organosilane V2, of organosilanes having epoxy groups.

In the present document, the term "silane group" refers to a silyl group which is bonded to an organic radical or to a polyorganosiloxane radical and has one to three, especially two or three, hydrolyzable substituents on the silicon atom.

Particularly common hydrolyzable substituents are alkoxy radicals. These silane groups are also referred to as "alkoxysilane groups". Silane groups may also be in partly or fully hydrolyzed form.

"Aminosilane" and "glycidoxysilane" refer respectively to organoalkoxysilanes having one or more amino and glycidoxy groups on the organic radical in addition to the silane group.

"Primary amino group" and "primary amine nitrogen" refer respectively to an $NH_2$ group and the nitrogen atom thereof that is bonded to an organic radical, and "secondary amino group" and "secondary amine nitrogen" refer respectively to an NH group and the nitrogen atom thereof that is bonded to two organic radicals which may also together be part of a ring, and "tertiary amino group" and "tertiary amine nitrogen" refer respectively to an N group and the nitrogen atom thereof that is bonded to three organic radicals, two or three of which together may also be part of one or more rings.

The term "organic polymer" encompasses a collective of macromolecules that are chemically homogeneous but differ in their degree of polymerization, molar mass, and chain length, which has been produced by a poly reaction (polymerization, polyaddition, polycondensation) and has a majority of carbon atoms in the polymer backbone, and also reaction products of such a collective of macromolecules. Polymers having a polyorganosiloxane backbone (commonly referred to as "silicones") are not organic polymers in the context of the present document.

"Molecular weight" in the present document is understood to mean the molar mass (in grams per mole) of a molecule or part of a molecule, also referred to as a "radical". "Average molecular weight" denotes the number-average Mn of an oligomeric or polymeric mixture of molecules or radicals, which is typically determined by means of gel permeation chromatography (GPC) against polystyrene as standard.

A substance or a composition is described as "storage-stable" or "storable" if it can be stored at room temperature in a suitable container over a prolonged period, typically for at least 3 months up to 6 months or more, without the storage resulting in any change in its application or use properties, particularly in the viscosity and crosslinking rate, to an extent relevant to the use thereof. In the present document substance names beginning with "poly", for example polyol, refer to substances formally containing two or more of the eponymous functional groups per molecule.

The term "polymer" in the present document firstly encompasses a collective of macromolecules that are chemically uniform but differ in relation to degree of polymerization, molar mass and chain length, said collective having been prepared by a poly reaction (polymerization, polyaddition, polycondensation). The term secondly also encompasses derivatives of such a collective of macromolecules from "poly" reactions, i.e. compounds that have been obtained by reactions, for example additions or substitutions, of functional groups on defined macromolecules and that may be chemically uniform or chemically nonuniform. The term further encompasses so-called prepolymers too, i.e. reactive oligomeric initial adducts, the functional groups of which are involved in the formation of macromolecules.

The term "pot life" is understood to mean the window of processibility of reactive compositions after application thereof. The end of the pot life in most cases is associated with such a rise in the viscosity of the composition that no further proper processing of the composition is possible.

A dashed line in the formulae in this document in each case represents the bond between a substituent and the associated molecular radical.

"Room temperature" refers to a temperature of about 23° C.

All industry standards or standards that are mentioned in this document, unless stated otherwise, relate to the version of the industrial standard or of the standard that was valid at the time of filing of the patent application.

The terms "mass" and "weight" are used synonymously in this document. Thus a "percentage by weight" (% by weight) is a percentage mass fraction which unless otherwise stated relates to the mass (the weight) of the total composition or, depending on the context, of the entire molecule.

Component A

The first component A of the two-component silicone composition contains at least one hydroxyl group-terminated polydiorganosiloxane P and between 0.05% and 5.0% by weight of water, based on component A.

Polydiorganosiloxane P

Component A of the two-component silicone composition comprises the hydroxyl group-terminated polydiorganosiloxane P, which is especially a polydiorganosiloxane P of the formula (IV).

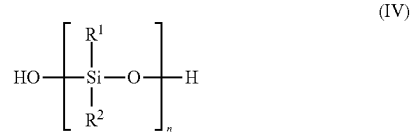

$$HO-\left[\begin{array}{c} R^1 \\ | \\ Si-O \\ | \\ R^2 \end{array}\right]_n H \quad (IV)$$

The $R^1$ and $R^2$ radicals here are independently linear or branched, monovalent hydrocarbyl radicals which have 1 to 12 carbon atoms and optionally include one or more heteroatoms, and optionally one or more C—C multiple bonds and/or optionally cycloaliphatic and/or aromatic components. In particular, the $R^1$ and $R^2$ radicals are alkyl radicals having 1 to 5, especially 1 to 3, carbon atoms, preferably methyl groups.

The index n is chosen such that the weight-average molecular weight $M_w$ of the polydiorganosiloxane P relative to polystyrene is 500 to 250'000 g/mol.

More particularly, the hydroxyl group-terminated polydiorganosiloxane P is a polydiorganosiloxane P1 of the formula (I) where n is chosen such that the weight-average molecular weight $M_w$ of the polydiorganosiloxane P1 relative to polystyrene is 30'000 to 80'000 g/mol, especially 40'000 to 60'000 g/mol; or in that the polydiorganosiloxane P' used is a mixture of i") at least one hydroxyl group-terminated polydiorganosiloxane P2 of the formula (I) where n is chosen such that the weight-average molecular weight $M_w$ of the polydiorganosiloxane P2 relative to polystyrene is >80'000 to 250'000 g/mol, especially 90'000 to 150'000 g/mol; and ii") at least one hydroxyl group-terminated polydiorganosiloxane P3 of the formula (I) where n is chosen such that the weight-average molecular weight $M_w$ of the polydiorganosiloxane P3 relative to polystyrene is 500 to ≤80'000 g/mol, especially 500 to 60'000 g/mol, preferably 1'000 to 30'000 g/mol.

Hydroxyl group-terminated polydiorganosiloxanes as shown in formula (I) in particular are known and commercially available. Polydiorganosiloxanes of this kind are also prepared in a known manner. For example, the preparation is described in U.S. Pat. No. 4,962,152, the disclosure of which is hereby incorporated by reference.

The above-described hydroxyl group-terminated polydiorganosiloxanes P preferably have a viscosity at 23° C. between 1 and 500'000 mPa·s, especially between 10 and 250'000 mPa·s.

Further preferably, the polydiorganosiloxane P1 has a viscosity at 23° C. between 5'000 and 20'000 mPa·s, especially between 5'000 and 10'000 mPa·s.

If the polydiorganosiloxane P' is a mixture of at least one hydroxyl group-terminated polydiorganosiloxane P2 and at least one hydroxyl group-terminated polydiorganosiloxane P3, the polydiorganosiloxane P2 preferably has a viscosity at 23° C. between 10'000 and 500'000 mPa·s, especially between 15'000 and 250'000 mPa·s, and the polydiorganosiloxane P3 preferably has a viscosity at 23° C. between 1 and 10'000 mPa·s, especially between 10 and 7'500 mPa·s, preferably between 20 and 6000 mPa·s.

The reported viscosities are measured to DIN 53018.

It may be advantageous to use multiple different polydiorganosiloxanes P2 and/or P3 as a mixture.

If the polydiorganosiloxane P' used is a mixture of at least one polydiorganosiloxane P2 and at least one polydiorganosiloxane P3, the proportion by weight of polydiorganosiloxane P2 is generally above the proportion by weight of polydiorganosiloxane P3. However, it should be taken into account that the respective proportions are dependent on the molecular weight of the respective polydiorganosiloxanes.

Component A contains the hydroxyl group-terminated polydiorganosiloxane P or the hydroxyl group-terminated polydiorganosiloxane P' preferably in an amount of between 30% by weight and 70% by weight, preferably between 30% by weight and 50% by weight, based on component A.

If the polydiorganosiloxane P' is a mixture of at least one hydroxyl group-terminated polydiorganosiloxane P2 and at least one hydroxyl group-terminated polydiorganosiloxane P3, component A preferably contains between 20% by weight and 60% by weight, preferably between 30% by weight and 50% by weight, based on component A, of hydroxyl group-terminated polydiorganosiloxane P2 and between 1% by weight and 15% by weight, preferably between 2% by weight and 10% by weight, based on component A, of hydroxyl group-terminated polydiorganosiloxane P3.

The polydiorganosiloxanes P described may, in any embodiment, also include proportions of branches (called T units) that bear Si—OH groups on side chains. However, it is preferable that the polydiorganosiloxanes are predominantly linear and are formed without Si—OH— reactive side chains. For the polydiorganosiloxanes P2 described, however, it may be advantageous with regard to the mechanical properties of the cured composition when a small proportion of the polydiorganosiloxane units of the polydiorganosiloxane P2 consists of T units, preferably 0-10%, especially 0.01% to 5%, most preferably 0.02% to 1%, of the siloxane units of the polydiorganosiloxane P2. The remaining siloxane units in all cases are D units, i.e. strictly linear siloxane units without Si—OH groups.

Water

Component A of the two-component silicone composition also comprises between 0.05% by weight and 5.0% by weight of water, especially emulsified water, based on component A. Water in component A leads to rapid uniform curing of the mixed two-component composition and is essential in order to enable a pot life adjustable in accordance with the invention. Water is preferably present in an amount of between 0.1% by weight and 2.5% by weight, especially between 0.1% by weight and 1.5% by weight, based on component A.

The water is preferably mixed in not in free form, but in the form of an emulsion (for example in silicone oil). This enables more homogeneous mixing-in with low concentration gradients and, after application, more uniform curing of the mixed composition. Advantageous water/oil emulsions have been found to be, for example, those with 40% to 60% by weight of water, based on the emulsion, especially with 50% by weight of water, based on the emulsion.

Component A of the two-component silicone composition may further comprise additional additives, for example fillers, plasticizers, pigments, and formulation additives such as dispersion additives or thixotropic agents. Such additives are known to the person skilled in the art of silicone formulation. These additives can improve the processibility and miscibility of component A and/or of the mixed two-component silicone composition. However, they are not essential to the effect of the invention.

Component B

The second component B of the two-component silicone composition contains:

i) at least one noncondensable polydiorganosiloxane as plasticizer;

ii) at least one catalyst K for the crosslinking of polydiorganosiloxanes;

iii) between 0% and 50% by weight, based on component B, of at least one first organosilane V1 of formula (I)

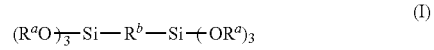
(I)

iv) between 2% and 60% by weight, based on component B, of at least one second organosilane V2 of formula (II)

 (II)

v) between 0% and 25% by weight, based on component B, of further organosilanes V3 having hydrolyzable alkoxysilane groups Si—OR$^a$ that are not covered by the formulae (I) and (II), where R$^a$ is a hydrogen atom or a monovalent linear or branched alkyl radical having 1 to 6 carbon atoms, R$^b$ is a divalent linear or branched alkyl radical or alkenyl radical having 2 to 20 carbon atoms, and R$^c$ is a divalent linear or branched alkyl radical which has 2 to 20 carbon atoms and contains at least one secondary amino group and optionally a hydroxyl group and an ether oxygen, with the proviso that the composition contains less than 10 mol %, based on the amount of organosilane V2, of organosilanes having epoxy groups.

Plasticizer

Component B, and preferably also component A, contains at least one noncondensable polydiorganosiloxane as plasticizer. This is typically a polydiorganosiloxane wherein the end groups have been capped with alkyl or vinyl groups and the polydiorganosiloxane accordingly cannot enter into any condensation or crosslinking reactions.

Such plasticizers are very well known to the person skilled in the art of silicone formulation, and these are sold, for example, under the Wacker® AK trade name series by Wacker Chemie, Germany and are described in detail further down. These nonreactive polydiorganosiloxanes are also referred to as silicone oils. They are obtainable in various chain lengths and hence viscosities, and have a particular purpose of enabling good incorporability of solid-state constituents such as fillers and of improving the mechanical properties and flow properties of the composition.

Component B preferably contains between 30% by weight and 50% by weight of plasticizer.

Component A preferably contains between 1% by weight and 10% by weight of plasticizer. Component A requires less plasticizer, or none at all, since component A already contains liquid hydroxyl group-terminated polydiorganosiloxanes.

It may be advantageous to combine various plasticizers of this kind, for example having different viscosities or different end groups.

Preferably, component B contains at least one plasticizer having vinylsilane end groups.

Catalyst K

Component B of the two-component silicone composition further comprises at least one catalyst K for the crosslinking of polydiorganosiloxanes. More particularly, the catalyst K is an organotin compound or a titanate.

Preferred organotin compounds are dialkyltin compounds as selected, for example, from the group consisting of dimethyltin di-2-ethylhexanoate, dimethyltin dilaurate, di-n-butyltin diacetate, di-n-butyltin di-2-ethylhexanoate, di-n-butyltin dicaprylate, di-n-butyltin di-2,2-dimethyloctanoate, di-n-butyltin dilaurate, di-n-butyltin distearate, di-n-butyltin dimaleate, di-n-butyltin dioleate, di-n-butyltin diacetate, di-n-octyltin di-2-ethylhexanoate, di-n-octyltin di-2,2-dimethyloctanoate, di-n-octyltin dimaleate and di-n-octyltin dilaurate. Titanates or organotitanates refer to compounds having at least one ligand bonded to the titanium atom via an oxygen atom. Suitable ligands bonded to the titanium atom via an oxygen-titanium bond are those selected from the group consisting of alkoxy group, sulfonate group, carboxylate group, dialkylphosphate group, dialkylpyrophosphate group and acetylacetonate group. Preferred titanates are, for example, tetrabutyl or tetraisopropyl titanate. Further suitable titanates have at least one polydentate ligand, also called chelate ligand. In particular, the polydentate ligand is a bidentate ligand. Suitable titanates are commercially available, for example, under the Tyzor® AA, GBA, GBO, AA-75, AA-65, AA-105, DC, BEAT, IBAY trade names from DuPont, USA.

It is of course possible or in some cases even preferable to use mixtures of different catalysts.

The proportion of the catalyst K for the crosslinking of polydiorganosiloxanes is preferably 0.05% to 10% by weight, especially 0.1% to 5% by weight, preferably 0.25% to 4% by weight, based on component B of the two-component silicone composition.

The amount of catalyst K influences the pot life and the pot life range that can be established in the mixed two-component composition. The higher the catalyst content, the shorter the pot life that can be established tends to be, and the faster the subsequent curing will be. However, these effects are also influenced to a large extent by the choice of crosslinkers. This is addressed further down.

Component B of the two-component silicone composition further contains at least one crosslinker, preferably two or more different crosslinkers, for silicone compositions. Crosslinkers refer here to organic silicon compounds having hydrolyzable alkoxysilane groups. The present invention distinguishes between three different types of crosslinker V1, V2 and V3, which are elucidated hereinafter.

It is essential to the effect of the present invention that all crosslinkers in the composition bear the same alkoxysilane groups. For example, all crosslinkers have methoxysilane groups, or all crosslinkers have ethoxysilane groups. Mixtures of different alkoxysilane groups are not advantageous and can hinder or even prevent the effect of the invention.

Crosslinker V1

Component B of the composition of the invention contains between 0% and 50% by weight, based on component B, of at least one first organosilane V1 of formula (I)

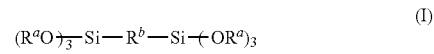 (I)

where R$^a$ is a hydrogen atom or a monovalent linear or branched alkyl radical having 1 to 6 carbon atoms, R$^b$ is a divalent linear or branched alkyl radical or alkenyl radical having 2 to 20 carbon atoms.

Preferably, R$^a$ is a hydrogen atom or a methyl or ethyl radical. Most preferably, R$^a$ is a hydrogen atom or an ethyl radical.

Silanes V1 having ethyl radicals as R$^a$, which are converted to hydrogen atoms after hydrolysis, are particularly advantageous because they firstly enable adjustment of pot life with particularly good controllability, nevertheless cure very rapidly, and additionally do not cause any emissions of toxic methanol.

Preferably, R$^b$ is a linear alkyl radical or alkenyl radical having 2 to 12 carbon atoms, preferably having 2 to 6 carbon atoms, most preferably an ethyl radical, a propyl radical, an ethylene radical or a propenyl radical.

Organosilane V1 is not absolutely necessary for the effect of the invention, but in combination with organosilane V2 has the advantage that, when present in the formulation, it enables better adjustability of pot life. With use of an organosilane V1, it is possible to increase the maximum possible pot life of the composition, but without significantly slowing the rate of curing after the end of the pot life.

Preferred embodiments of the composition of the invention contain between 10% by weight and 30% by weight, preferably between 12% by weight and 20% by weight, of organosilane V1, based on component B.

Crosslinker V2

Component B of the composition of the invention contains between 2% and 60% by weight, based on component B, of at least one second organosilane V2 of formula (II)

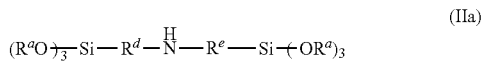

(IIa)

where $R^a$ has the same meaning as described for the organosilane V1, and $R^c$ is a divalent linear or branched alkyl radical which has 2 to 20 carbon atoms and contains at least one secondary amino group and optionally a hydroxyl group and an ether oxygen.

Preferably, organosilane V2 has a structure as described in formula (IIa)

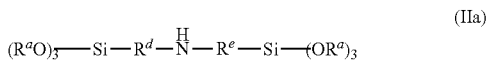

(IIa)

where $R^d$ is a divalent linear or branched alkyl radical which has 2 to 10 carbon atoms and optionally contains a hydroxyl group and an ether oxygen, and $R^e$ is a divalent linear or branched alkyl radical having 2 to 10 carbon atoms.

Preferred embodiments of the composition of the invention contain between 5% by weight and 50% by weight, preferably between 10% by weight and 45% by weight, of organosilane V2, based on component B.

In a particularly preferred embodiment, the organosilane V2 is an organosilane V2a in which the $R^d$ and $R^e$ radicals in formula (IIa) are both a divalent linear or branched alkyl radical having 2 to 10 carbon atoms, especially a propyl radical.

In another particularly preferred embodiment, the organosilane V2 is an organosilane V2b in which $R^e$ radical in formula (IIa) is a divalent linear or branched alkyl radical having 2 to 10 carbon atoms, especially a propyl radical, and $R^d$ radical is a divalent linear or branched alkyl radical having 2 to 10 carbon atoms, especially a propyl radical, and additionally one of the two structural elements shown in formula (IIb). The NH group in formula (IIb) here is the NH group in formula (IIa), and the dotted line on the oxygen atom is bonded to the divalent linear or branched alkyl radical having 2 to 10 carbon atoms, especially the propyl radical.

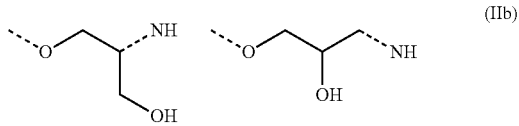

(IIb)

Organosilanes V2a are commercially available, for example under the Dynasylan® 1122 trade name (Evonik).

Organosilanes V2b are readily preparable from commercially available organosilanes, for example from the reaction of an equimolar amount of 3-aminopropyltriethoxysilane with 3-glycidoxypropyltriethoxysilane with exclusion of water until conversion of the epoxy groups is complete.

In a preferred embodiment of the composition of the invention, exclusively organosilane V2a is used as organosilane V2. In this embodiment, the content of catalyst K is preferably between 0.1% by weight and 2% by weight, especially between 0.2% by weight and 1% by weight, based on component B. This enables an exactly adjustable, user-friendly but short pot life and very rapid curing, and is particularly suitable for automated application by machine with short cycle times.

Preferred embodiments of this embodiment of the composition of the invention contain between 10% by weight and 50% by weight, preferably between 15% by weight and 45% by weight, of organosilane V2a, based on component B.

In another preferred embodiment of the composition of the invention, exclusively organosilane V2b is used as organosilane V2. In this embodiment, the content of catalyst K is preferably between 1% by weight and 4% by weight, especially between 1.5% by weight and 3.5% by weight, based on component B. This enables an exactly adjustable, particularly long pot life and nevertheless rapid subsequent curing, and is particularly suitable for manual application or use on particularly large objects.

Preferred embodiments of this embodiment of the composition of the invention contain between 10% by weight and 50% by weight, preferably between 15% by weight and 45% by weight, of organosilane V2b, based on component B.

In a further preferred embodiment of the composition of the invention, a mixture of organosilane V2a and organosilane V2b is used as organosilane V2. In this embodiment, the content of catalyst K is preferably between 0.1% by weight and 2% by weight, especially between 0.2% by weight and 1% by weight, based on component B. This enables a very exactly adjustable, user-friendly but short to average pot life and very rapid curing and is suitable particularly for automated application by machine with short cycle times, and also of particularly good suitability for a freely variable pot life by means of different mixing ratios of components A and B. This is particularly advantageous for flexible application or in complex applications, where a varying pot life but always the same final properties of the cured composition is desirable.

In this embodiment, the organosilanes V2a and V2b are preferably used in the formulation in a weight ratio between 1:2 and 2:1.

Preferred embodiments of this embodiment of the composition of the invention contain between 5% by weight and 25% by weight, preferably between 7.5% by weight and 22.5% by weight, of organosilane V2a, based on component B, and between 5% by weight and 25% by weight, preferably between 7.5% by weight and 22.5% by weight, of organosilane V2a, based on component B.

Crosslinker V3

Component B of the two-component silicone composition also preferably comprises between 0% and 25% by weight, based on component B, of further organosilanes V3 having hydrolyzable alkoxysilane groups $Si—OR^a$ that are not covered by the formulae (I) and (II). These likewise serve as crosslinkers, but are optional.

The additional organosilane V3 is especially a silane of the formula (III).

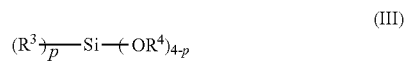

$$(R^3)_{\overline{p}}-Si-(OR^4)_{4-p} \quad (III)$$

The $R^3$ radical here is independently a linear or branched, monovalent hydrocarbyl radical which has 1 to 12 carbon atoms and optionally includes one or more heteroatoms, and optionally one or more C—C multiple bonds and/or optionally cycloaliphatic and/or aromatic components.

The $R^4$ radical is an $R^a$ radical as described further up.

The index p has a value of 0 to 4, with the proviso that, if p has a value of 3 or 4, at least p-2 $R^3$ radicals each have at least one group reactive, especially condensable, with the hydroxyl groups of the polydiorganosiloxane P, i.e. a hydroxyl group for example. In particular, p has a value of 0, 1 or 2, preferably a value of 0.

For the choice of the silane of the formula (III) as crosslinker for polydiorganosiloxanes, different demands on the two-component silicone composition may be crucial. On the one hand, the reactivity of the silane plays an important role, preference being given in principle to more highly reactive silanes. For that reason, for example, preference is given to a vinyl group over a methyl group or to a methyl group over an ethyl group as $R^3$ radical. On the other hand, toxicological reasons may also be crucial for the choice of crosslinker. For example, preference is therefore given to tetraethoxysilane as crosslinker over tetramethoxysilane.

Examples of suitable silanes of the formula (III) are methyltrimethoxysilane, chloromethyltrimethoxysilane, ethyltrimethoxysilane, propyltrimethoxysilane, vinyltrimethoxysilane, methyltriethoxysilane, vinyltriethoxysilane, phenyltriethoxysilane, methyltripropoxysilane, phenyltripropoxysilane, tetramethoxysilane, tetraethoxysilane, tetra-n-propoxysilane or tetra-n-butoxysilane.

More preferably, the silane of the formula (III) is vinyltriethoxysilane, methyltriethoxysilane, dimethyltriethoxysilane or tetraethoxysilane or a mixture thereof.

In addition, the silanes may also be present in partly hydrolyzed (a portion of all $R^4$=H) or fully hydrolyzed form (all $R^4$=H). On account of the greatly elevated reactivity of partly or fully hydrolyzed silanes, the use thereof as crosslinker may be advantageous. The person skilled in the art is aware here that, when partly or fully hydrolyzed silanes are used, there can be formation of oligomeric siloxanes, especially to give dimers and/or trimers, which are formed by condensation of hydrolyzed silanes. Accordingly, crosslinkers used for the two-component silicone composition may also be oligomeric siloxanes.

For example, suitable oligomeric siloxanes are hexamethoxydisiloxane, hexaethoxydisiloxane, hexa-n-propoxydisiloxane, hexa-n-butoxydisiloxane, octaethoxytrisiloxane, octa-n-butoxytrisiloxane and decaethoxytetrasiloxane.

The crosslinker used for the two-component silicone composition may of course also be any mixture of the aforementioned silanes.

The proportion of the organosilane V3 is preferably 0.1% to 20% by weight, especially 1% to 15% by weight, preferably 2% to 12% by weight, based on component B of the two-component silicone composition.

The two-component silicone composition may optionally contain further constituents in one or both of components A and B.

Such additional constituents are especially plasticizers that are obligatory in component B, inorganic and/or organic fillers, curing accelerators, pigments, adhesion promoters, processing auxiliaries, rheology modifiers, stabilizers, dyes, inhibitors, heat stabilizers, antistats, flame retardants, biocides, waxes, leveling agents, thixotropic agents, and further standard raw materials and additives that are known to the person skilled in the art.

When such optional constituents are used, it is important to ensure that constituents that could impair the storage stability of the composition by reaction with one another or with other ingredients are stored separately from one another.

In addition, it is advantageous to select all the constituents mentioned that may be present in the two-component silicone composition so as to not adversely affect the storage stability of the two components of the two-component silicone composition by virtue of the presence of such a constituent, meaning that the properties of the composition, especially the application and curing properties, are altered only slightly, if at all, in the course of storage. This means that reactions that lead to chemical curing of the two-component silicone composition described do not occur to a significant degree during storage. It is therefore especially advantageous that the constituents mentioned contain, or release in the course of storage, no water or traces of water at most. It may therefore be advisable to subject certain constituents to chemical or physical drying before mixing them into the composition.

Particularly suitable plasticizers are trialkylsilyl-terminated polydialkylsiloxanes, especially trimethylsilyl-terminated polydimethylsiloxanes, as already described further up. Preference is given to trimethylsilyl-terminated polydimethylsiloxanes having viscosities between 1 and 10'000 mPa·s.

Particular preference is given to viscosities between 10 and 1'000 mPa·s.

However, it is also possible to use trimethylsilyl-terminated polydimethylsiloxanes in which some of the methyl groups have been replaced by other organic groups, for example phenyl, vinyl or trifluoropropyl. Even though particular preference is given to using linear trimethylsilyl-terminated polydimethylsiloxanes as plasticizers, it is also possible to use compounds that are branched. Such branched compounds result from use of small amounts of tri- or tetrafunctional silanes in the starting materials that serve for preparation thereof. It is also possible, rather than the polysiloxane plasticizers, to use other organic compounds, for example particular hydrocarbons or mixtures thereof, as plasticizers. Hydrocarbons of this kind may be aromatic or aliphatic. In the selection, it should be ensured particularly that these hydrocarbons have low volatility and sufficient compatibility with the other constituents of the silicone composition.

Preferably, the composition also includes at least one filler in one or both of components A and B. The filler influences both the rheological properties of the uncured composition and the mechanical properties and surface characteristics of the cured composition. It is possible to use either active or passive fillers in the two-component silicone composition. In the case of active fillers, there is occurrence of chemical or physical interactions with the polymer; in the case of passive fillers, these occur only to a minor degree, if at all.

Suitable fillers are inorganic and organic fillers, for example natural, ground or precipitated calcium carbonates that have optionally been coated with fatty acids, especially stearic acid, calcined kaolins, aluminum oxides, aluminum hydroxides, silicas, especially finely divided silicas from pyrolysis processes, industrially produced carbon black, aluminum silicates, magnesium aluminum silicates, zirconium silicates, ground quartz, ground cristobalite, diatomaceous earth, mica, iron oxides, titanium oxides, zirconium oxides, gypsum, annalin, barium sulfate ($BaSO_4$, also called baryte or heavy spar), boron carbide, boron nitride, graphite, carbon fibers, glass fibers or hollow glass beads, the surface of which may have been treated with a hydrophobizing agent. Preferred fillers are calcium carbonates, calcined kaolins, carbon black, finely divided silicas and flame-retardant fillers such as hydroxides or hydrates, especially hydroxides or hydrates of aluminum, preferably aluminum hydroxide.

In a preferred embodiment, the silicone composition contains finely divided silicas from pyrolysis processes or calcium carbonates as filler.

It is entirely possible and may even be advantageous to use a mixture of different fillers.

A suitable amount of filler is, for example, in the range from 10% by weight to 70% by weight, especially 15% by weight to 60% by weight, preferably 30% by weight to 60% by weight, based on the overall two-component silicone composition.

Particularly suitable adhesion promoters are alkoxysilanes that have preferably been substituted by functional groups. The functional group is, for example, an aminopropyl, glycidoxypropyl or mercaptopropyl group. Preference is given to amino-functional groups. The alkoxy groups of such silanes are usually a methoxy or ethoxy group. Particular preference is given to aminopropyltrimethoxysilane, 3-aminopropyltriethoxysilane, 3-(2-aminoethyl)aminopropyltriethoxysilane and 3-mercaptopropyltriethoxysilane. It is also possible to use a mixture of adhesion promoters. Further suitable adhesion promoters are, for example, also amino-functional alkylsilsesquioxanes such as amino-functional methylsilsesquioxane or amino-functional propylsilsesquioxane, alkoxylated alkyleneamines, especially ethoxylated and/or propoxylated alkylenediamines, and further, especially substituted, oligomers, polymers or copolymers based on polyalkylene glycols. However, this is subject to the proviso that the composition contains less than 10 mol %, based on the amount of organosilane V2, of organosilanes having epoxy groups, or glycidoxy groups. Preferably, the composition contains less than 5 mol %, especially less than 1 mol %, based on the amount of organosilane V2, of organosilanes having epoxy groups. The effect of the presence of organosilanes with epoxy groups in amounts above these ranges is that the effect of the invention is significantly hindered and the composition no longer cures properly.

It will be clear to the person skilled in the art that it is possible in the case of use of silanes as adhesion promoters that these may be in partly or fully hydrolyzed form according to the conditions, for example moisture. It is also known to the person skilled in the art that, in the presence of such partly or fully hydrolyzed silanes, condensation reactions can result in formation of oligomeric siloxanes, especially to give dimers and/or trimers.

The proportion of the adhesion promoter is preferably 0.1% to 15% by weight, especially 1% to 10% by weight, preferably 1% to 5% by weight, of the overall two-component silicone composition. In preferred embodiments, especially with use of organosilanes V2b, however, the composition preferably does not contain any further adhesion promoters.

It is very well known to the person skilled in the art that constituents as more particularly detailed above can have not only a single function or effect described thereto. Instead, it is customary for a single constituent or a single compound to have multiple functions. For example, some adhesion promoters are also crosslinkers, or fillers are simultaneously also rheology modifiers or the like. For example, the organosilanes V2, and in particular compound V2b, have good adhesion-promoting action.

A particularly preferred embodiment of component A of the silicone composition of the invention comprises:
between 30% by weight and 60% by weight, preferably between 40% by weight and 50% by weight, based on component A, of the at least one hydroxyl group-terminated polydiorganosiloxane P as described above;
between 0.05% by weight and 5.0% by weight, preferably between 0.1% by weight and 2% by weight, of water, based on component A; and optionally plasticizers, fillers, formulation additives, pigments, and further additives as described above.

Particularly preferred embodiments of this embodiment contain, as polymer P, a mixture of
between 28% by weight and 50% by weight, preferably between 30% by weight and 45% by weight, based on component A, of polymer P2 as described above; and
between 2% by weight and 10% by weight, preferably between 3% by weight and 8% by weight, based on component A, of polymer P3 as described above.

A particularly preferred embodiment of component B of the silicone composition of the invention comprises:
between 0.1% by weight and 4% by weight, preferably between 0.25% by weight and 3% by weight, based on component B, of catalyst K as described above; and
between 25% by weight and 60% by weight, preferably between 30% by weight and 50% by weight, based on component B, of plasticizer as described above; and
between 5% by weight and 25% by weight, preferably between 10% by weight and 20% by weight, based on component B, of organosilane V1 as described above; and
between 5% by weight and 25% by weight, preferably between 7.5% by weight and 20% by weight, based on component B, of organosilane V2a as described above; and
between 5% by weight and 25% by weight, preferably between 7.5% by weight and 20% by weight, based on component B, of organosilane V2b as described above; and
between 5% by weight and 25% by weight, preferably between 10% by weight and 20% by weight, based on component B, of organosilane V3 as described above; and
optionally fillers, formulation additives, pigments, and further additives as described above.

The two-component silicone composition of the invention is typically stored in a pack having two separate chambers. Component A here is present in one chamber and component B in the other chamber of the pack. Suitable packs are, for example, double cartridges, such as twin or coaxial cartridges, or multichamber tubular pouches with adapters. Preference is given to mixing the two components A and B with the aid of a static mixer that can be fitted onto the pack having two chambers.

Such suitable packs are described, for example, in US 2006/0155045 A1, WO 2007/096355 A1 and in US 2003/0051610 A1.

In an industrial scale plant, the two components A and B are typically stored separately from one another in vats or hobbocks, and expressed and mixed on application, for example by means of gear pumps. The composition can be applied here to a substrate manually or in an automated process by robot.

More particularly, the two-component silicone composition of the invention is used in such a way that the weight ratio of component A to component B is ≥1:1, especially from 3:1 to 15:1, preferably from 10:1 to 13:1.

One advantage of the use of components A and B in the preferred weight ratio described is that existing plants for delivery and application of two-component silicone compositions in this manner are very widespread, and retrofitting of the plants for the application of components A and B in a weight ratio of 1:1, for example, on the part of the user would be associated with a high level of cost and inconvenience.

Further preferably, component B does not include any crosslinkable polydiorganosiloxanes. The advantage of this is better storage stability of component B.

Especially component B of the above-described two-component silicone composition is produced and stored with exclusion of moisture. Separately from one another, the two components are storage-stable, meaning that they can be stored with exclusion of moisture in a suitable pack or arrangement as described above over a period of several months to up to a year or longer without any change in their use properties or in their properties after curing to a degree of relevance for their use. Typically, the storage stability is ascertained by the measurement of the viscosity or of the reactivity over time.

In the application of the two-component silicone composition, components A and B are mixed with one another, for example by stirring, kneading, rolling or the like, but especially by means of a static mixer. The hydroxyl groups of the hydroxyl group-terminated polydiorganosiloxane P come into contact here with the hydrolyzable groups or if appropriate with already hydrolyzed groups of the crosslinker, which results in curing of the composition by condensation reactions. Contact of the silicone composition with water, especially in the form of air humidity, on application can likewise promote crosslinking, since reaction of the water with the hydrolyzable groups of the crosslinker forms silanol groups, the reactivity of which is elevated compared to the hydroxyl groups of the polydiorganosiloxane P. The two-component silicone composition is especially cured at room temperature.

As reaction products of the condensation reaction, the crosslinking of the two-component silicone composition especially also gives rise to compounds of the formula HO—$R^a$ where $R^a$ has already been described above. Preferably, these by-products of the condensation reaction are compounds that impair neither the composition nor the substrate to which the composition is applied. Most preferably, the reaction product of the formula HO—$R^a$ is a compound that volatilizes readily out of the crosslinking or already crosslinked composition.

The invention further relates to a cured silicone composition as obtainable from an above-described two-component silicone composition by mixing component A with component B.

The invention further relates to the use of two-component silicone compositions as described above as adhesive, sealant, as coating or as casting compound. The composition of the invention is preferably used as adhesive.

The two-component silicone composition of the invention is especially used in a method of bonding two substrates S1 and S2, comprising the steps of
  a) applying a two-component silicone composition as described above to a substrate S1 and/or a substrate S2;
  b) contacting substrates S1 and S2 via the composition applied within the open time of the composition;
  c) curing the composition by reaction of components A and B; wherein substrates S1 and S2 are the same or different.

Preference is also given to using the composition of the invention in a method of sealing or coating, comprising the steps of
  a') applying a two-component silicone composition as described above to a substrate S1 and/or between two substrates S1 and S2;
  b') curing the composition by reaction of components A and B;
  wherein substrates S1 and S2 are the same or different.

It is of course clear to the person skilled in the art that the two components A and B must be mixed with one another immediately before or during the application of the two-component composition.

The two-component silicone composition of the invention preferably has a pasty consistency with structurally viscous properties. Such a composition is applied to the substrate with a suitable device, preferably in the form of a bead, which advantageously has an essentially round or triangular cross-sectional area.

A composition of the invention having good application properties has high creep resistance and forms short threads. This means that it remains in the shape applied after application, i.e. does not flow away, and after the application device has been pulled away forms only a very short thread, if any, such that the substrate is not soiled.

Suitable substrates S1 and/or S2 are especially substrates selected from the group consisting of concrete, mortar, brick, tile, ceramic, gypsum, natural stone such as granite or marble, glass, glass ceramic, metal or metal alloys such as aluminum, steel, nonferrous metal, zinc-plated metal, wood, plastics such as PVC, polycarbonate, polymethyl(meth) acrylate, polyester, epoxy resin, paint and varnish.

The two-component silicone composition especially finds use in industrial manufacture, especially of vehicles and consumer articles for everyday use, and in the construction sector, especially in civil engineering below and above ground. Preference is given to using the two-component silicone composition in window construction.

In addition, the invention relates to an article including an at least partly cured silicone composition according to the above description, which article is especially a built structure, an industrial good or a mode of transport, especially a building, or a part thereof.

An illustrative enumeration of such articles is houses, glass facades, windows, baths, bathrooms, kitchens, roofs, bridges, tunnels, roads, automobiles, trucks, rail vehicles, buses, ships, mirrors, panes, tanks, white goods, domestic appliances, machine dishwashers, washing machines, baking ovens, headlamps, foglights or solar panels.

The present invention further relates to a method of adjusting pot life with the same mechanical properties after curing of a two-component silicone composition as described above, characterized in that the mixing ratio of component A to component B based on weight is selected arbitrarily within the range of component A to component B from 1:1 to 25:1, especially from 5:1 to 20:1, preferably from 7:1 to 16:1.

With the aid of this method, it is possible to adjust the pot life of a two-component silicone composition of the invention within wide limits solely via the mixing ratio of the two components A and B. After the end of the pot life established, the composition cures unusually rapidly and very uniformly. Irrespective of the mixing ratio chosen, the final properties, especially mechanical properties, of the cured composition are largely the same. This is extremely advantageous and permits the user to establish and to vary a flexible but very exactly controllable pot life without having to change components A and B of the composition and solely via the adjustment of the mixing ratio, for example via alternate delivery output in a pump.

Thus, it is possible to observe optimization of cycle times even under varying process conditions without having to change the silicone material.

The composition of the invention cures unusually rapidly after the end of the pot life. In preferred embodiments of the silicone composition of the invention, the ratio of pot life to freedom from tack (time until the surface of the silicone composition applied has become tack-free as a result of far-advanced curing) is <2.5, especially between 1.1 and 2.3, preferably between 1.2 and 2:1. This enables a very efficient process regime since the composition, after application, cures extremely rapidly, and the substrate to which the composition has been applied can be processed further or transported immediately.

Prior art two-component silicone compositions, by contrast, typically have a very long pot life and simultaneously a very long curing time, or else very rapid curing combined with an extremely short, user-unfriendly pot life. The present invention permits establishment of long or short pot lives as required, but it always permits very rapid curing after application.

EXAMPLES

Working examples are adduced hereinafter, which are intended to further elucidate the invention described. The invention is of course not limited to these described working examples.

Preparation of the Silicone Compositions

The following compositions were produced:

As components A and B, the constituents listed in tables 1 and 2 were mixed with one another in the percentages by weight specified in a dissolver at room temperature under inert atmosphere, and stirred in until a macroscopically homogeneous paste was obtained.

The components A and B produced were introduced into the separate chambers of twin cartridges, and the cartridges were closed. On application, components A and B were mixed by static mixer.

Description of Test Methods

Viscosity was determined by rheometer (Anton Paar Physica MCR 101 in a plate-plate measurement setup, diameter of the plate: 25 mm) to DIN 53018. Freedom from tack of the composition was measured by mixing, by means of a tumbling mixer, components A and B that had been conditioned at 23° C. in a closed cartridge for 24 hours beforehand in a weight ratio as specified in the table. Subsequently, the mixed mass was applied to the rheometer, compressed to 0.5 mm and subjected to shear at a constant frequency (0.08 1/s). The rise in viscosity was plotted against time and measured up to a maximum value of 90'000 Pa·s. The attainment of the viscosity of 90'000 Pa·s is in good correlation with the freedom from tack determined manually on the mixed material and is therefore considered to be a systematically detected value for freedom from tack.

For determination of pot life (also called open time) of the composition, a mixed material was prepared analogously to the determination of freedom from tack. A wooden spatula was introduced into the mass. Every minute, the spatula was used to determine whether the mixed mass still has pasty character. As soon as the mass shows partial elastic behavior, the pot life is considered to have been attained.

Lap shear strength and elongation at maximum shear force were measured to DIN EN 1465 on films having a layer thickness of 2 mm that were stored at 23° C., 50% relative air humidity, for 7 days, at a measurement speed of 20 mm/min on a Zwick/Roell Z005 tensile tester. The values reported are the averages of three measurements.

Shore A hardness was determined to DIN 53505 after storage of the cured composition at 23° C. and 50% relative air humidity for 7 days.

The method of determining tear propagation resistance (TPR) and the production of the test specimens required for the purpose are described in DIN ISO 34-1. Measurement was effected on type C test specimens.

The method of determining elongation at maximum tensile force, force at 100% elongation and tensile strength and the production of the test specimens required for the purpose are described in ISO 527. Measurement was effected at 23° C. and 50% relative air humidity on a type 5A test specimen (ISO 527-2) and with a tension rate of 200 mm/min.

Preparation of Crosslinker V2b 88.6 g of 3-aminopropyltriethoxysilane (Dynasylan® AMEO, Evonik) were mixed with 111.4 g of 3-glycidoxypropyltriethoxysilane (Dynasylan® GLYEO, Evonik) in a glass vessel under nitrogen atmosphere. The vessel was closed and left at 50° C. for 7 days. The resulting mixture, which was free of detectable epoxy groups, was used without workup as organosilane V2b.

TABLE 1

Two-component silicone compositions 1 to 6.

| | Composition | 1 Ref | 2 | 3 | 4 | 5 | 6 |
|---|---|---|---|---|---|---|---|
| A | OH-term. PDMS $^a$ (viscosity (23° C.) 20'000 mPa · s) (polymer P2) | 38.3 | 38.3 | 38.3 | 38.3 | 44.3 | 33.0 |
| | OH-term. PDMS $^a$ (viscosity (23° C.) 6'000 mPa · s) (polymer P3) | 4.0 | 4.0 | 4.0 | 4.0 | 4.0 | 5.0 |
| | OH-term. PDMS a (viscosity (25° C.) 100 mPa · s) (polymer P3) | 2.0 | 2.0 | 2.0 | 2.0 | — | 2.0 |
| | Plasticizer (Wacker ® AK 10) | 6.0 | 6.0 | 6.0 | 6.0 | 6.0 | — |
| | Plasticizer (Wacker ® AK 100) | — | — | — | — | — | 7.0 |
| | Polypropylene glycol dispersion additive | 1.0 | 1.0 | 1.0 | 1.0 | 1.0 | 1.0 |
| | Silicone oil in water emulsion (50% H$_2$O) | 0.3 | 0.3 | 0.3 | 0.3 | 0.3 | 1.0 |
| | Hakuenka ® CCR-S (hydrophobized precipitated chalk) | 19.0 | 19.0 | 19.0 | 19.0 | 19.0 | 38.0 |

TABLE 1-continued

Two-component silicone compositions 1 to 6.

| | Composition | 1 Ref | 2 | 3 | 4 | 5 | 6 |
|---|---|---|---|---|---|---|---|
| | Imercarb ® 74S (ground chalk) | 28.0 | 28.0 | 28.0 | 28.0 | 28.0 | 10.0 |
| | Aerosil ® R972 (hydrophobic fumed silica) | 1.5 | 1.5 | 1.5 | 1.5 | 1.5 | 1.5 |
| | Pigment | — | — | — | — | — | 3.0 |
| B | Vinyl-terminated PDMS [b] (plasticizer) | 38.6 | 40.75 | 46.0 | 44.0 | 40.75 | 46.0 |
| | Dynasylan ® 1122 (crosslinker V2a) | — | 20.0 | 42.0 | — | 20.0 | 9.0 |
| | Crosslinker V2b (see preparation method) | — | 20.0 | — | 42.0 | 20.0 | 10.0 |
| | Geniosil ® GF 96 (aminotrimethoxysilane) | 19.95 | — | — | — | — | — |
| | Geniosil ® GF 80 (epoxytrimethoxysilane) | 10.0 | — | — | — | — | — |
| | Wacker ® Silane M1 Trimethoxy (methyltrimethoxysilane) (crosslinker V3) | 9.0 | — | — | — | — | — |
| | Wacker ® Cross-linker ET15 (crosslinker V1) | — | — | — | — | — | 19.0 |
| | Vinyltriethoxysilane (crosslinker V3) | — | — | — | — | — | 7.0 |
| | Monarch ® 570 (carbon black) | 15.8 | 15.8 | — | — | 15.8 | — |
| | Aerosil ® R972 (hydrophobic fumed silica) | 5.6 | 3.0 | 11.0 | 11.0 | 3.0 | 8.0 |
| | Catalyst [c] | 0.45 | 0.45 | 1.0 | 3.0 | 0.45 | 1.0 |

[a] OH-term. PDMS: OH group-terminated polydimethylsiloxane;
[b] Vinyl-term. PDMS: vinyl group-terminated polydimethylsiloxane having a viscosity to DIN 53018 of 20'000 mPa · s;
[c] organotin compound (dioctyltin dilaurate).

Pot Life and Freedom from Tack (Curing Time)

Table 2 shows that the compositions of the invention have a very low ratio of pot life to freedom from tack, and hence cure extremely rapidly after the pot life has ended.

TABLE 2

Measurement data for pot life and freedom from tack of compositions 1 to 3. The mixing ratio of component A to component B was always 13:1 (w/w).

| Composition | 1 Ref | 2 | 3 | 4 | 5 |
|---|---|---|---|---|---|
| Pot life | 29 min | 33 min | 21 min | 125 min | 94 min |
| Freedom from tack (time until largely cured) | 84 min | 42 min | 25 min | 153 min | 131 min |
| Ratio of freedom from tack: pot life | 2.9 | 1.3 | 1.2 | 1.2 | 1.4 |

Mechanical Properties and Mixing Ratio

Table 3 shows that the alteration of the mixing ratio (weight) allows the pot life to be adjusted. However, the mechanical properties after curing remain virtually unaffected.

TABLE 3

Measurement data of composition 6 at various mixing ratios of component A:component B. n/m means that the value was not measured.

| Composition | | | 6 | | |
|---|---|---|---|---|---|
| Mixing ratio A:B (w/w) | 7:1 | 10:1 | 13:1 | 16:1 |
| Pot life [min] | 4 | 7 | 11 | 16 |
| Freedom from tack [min] | n/m | n/m | 22 | n/m |
| Shore A hardness (7d SCC) | 48 | 43 | 49 | 45 |
| Lap shear strength (7d SCC) [MPa] | 1.4 | 1.3 | 1.3 | 1.3 |
| Elongation at maximum shear force [%] | 230 | 220 | 200 | 250 |

TABLE 4

Two-component silicone compositions 7 to 9.

| | Composition | 7 Ref | 8 | 9 |
|---|---|---|---|---|
| A | OH-term. PDMS [a] (viscosity (23° C.) 20'000 mPa · s) (polymer P2) | 33.9 | 33.5 | 33.2 |
| | OH-term. PDMS [a] (viscosity (23° C.) 6'000 mPa · s) (polymer P3) | 5.1 | 5.1 | 5.0 |
| | OH-term. PDMS [a] (viscosity (25° C.) 100 mPa · s) (polymer P3) | 2.0 | 2.0 | 2.0 |
| | Plasticizer (Wacker ® AK 100) | 7.2 | 7.1 | 7.0 |
| | Polypropylene glycol dispersion additive | 1.0 | 1.0 | 1.0 |
| | Silicone oil in water emulsion (50% $H_2O$) | — | 1.0 | 2.0 |
| | Hakuenka ® CCR-S (hydrophobized precipitated chalk) | 39.0 | 38.6 | 38.2 |
| | Imercarb ® 74S (ground chalk) | 10.3 | 10.2 | 10.1 |
| | Aerosil ® R972 (hydrophobic fumed silica) | 1.5 | 1.5 | 1.5 |
| B | Vinyl-terminated PDMS [b] (plasticizer) | 46.0 | 46.0 | 46.0 |
| | Dynasylan ® 1122 (crosslinker V2a) | 9.0 | 9.0 | 9.0 |
| | Crosslinker V2b (see preparation method) | 10.0 | 10.0 | 10.0 |
| | Geniosil ® GF 96 (aminotrimethoxysilane) | — | — | — |
| | Geniosil ® GF 80 (epoxytrimethoxysilane) | — | — | — |
| | Wacker ® Silane M1 Trimethoxy (methyltrimethoxysilane) (crosslinker V3) | — | — | — |
| | Wacker ® Cross-linker ET15 (crosslinker V1) | 19.0 | 19.0 | 19.0 |
| | Vinyltriethoxysilane (crosslinker V3) | 7.0 | 7.0 | 7.0 |
| | Monarch ® 570 (carbon black) | — | — | — |
| | Aerosil ® R972 (hydrophobic fumed silica) | 8.0 | 8.0 | 8.0 |
| | Catalyst [c] | 1.0 | 1.0 | 1.0 |

[a] OH-term. PDMS: OH group-terminated polydimethylsiloxane;
[b] Vinyl-term. PDMS: vinyl group-terminated polydimethylsiloxane having a viscosity to DIN 53018 of 20'000 mPa · s;
[c] organotin compound (dioctyltin dilaurate).

Influence of the Amount of Water

In order to study the influence of the amount of water in component B, experiments 7 to 9 were conducted. The mixtures were formulated and applied analogously to the preceding experiments 1-9. The compositions of experiments 7 to 9 are shown in table 4.

The test results are shown in table 5.

TABLE 5

Measurement data for pot life and mechanical properties of compositions 7 to 9. The mixing ratio of component A to component B was always 13:1 (w/w).

| Composition | 7 Ref | 8 | 9 |
|---|---|---|---|
| Pot life [min] | 18 | 9 | 8.5 |
| Lap shear strength (7d SCC) [MPa] | 1.28 | 1.49 | 1.52 |
| Elongation at maximum shear force [%] | 198 | 228 | 231 |
| Tensile strength (7d RT) [MPa] | 2.05 | 2.42 | 2.22 |
| Force at 100% elongation [MPa] | 1.3 | 1.73 | 1.64 |
| Elongation at maximum tensile strength [%] | 229 | 176 | 169 |
| Shore A hardness (7d RT) | 43 | 48 | 52 |
| Tear propagation resistance [N/mm] | 2.84 | 3.47 | 3.65 |

The data from table 5 show that, without water present in accordance with the invention, curing does take place, but the pot life becomes much longer and, surprisingly, the chemical data in reference example 7 are much worse.

The invention claimed is:

1. A two-component silicone composition consisting of a component A comprising
    i) at least one hydroxyl group-terminated polydiorganosiloxane P;
    ii) between 0.05% and 5.0% by weight of water, based on component A; and a component B comprising
    i) at least one noncondensable polydiorganosiloxane as plasticizer;
    ii) at least one catalyst K for the crosslinking of polydiorganosiloxanes;
    iii) between 0% and 50% by weight, based on component B, of at least one first organosilane V1 of formula (I)

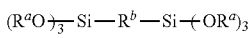
(I)

iv) between 2% and 60% by weight, based on component B, of at least one second organosilane V2 of formula (II)

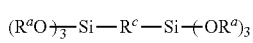
(II)

v) up to 25% by weight, based on component B, of further organosilanes V3 having hydrolyzable alkoxysilane groups Si—$OR^a$ that are not covered by the formulae (I) and (II),
    where $R^a$ is a hydrogen atom or a monovalent linear or branched alkyl radical having 1 to 6 carbon atoms,
    $R^b$ is a divalent linear or branched alkyl radical or alkenyl radical having 2 to 20 carbon atoms, and
    $R^c$ is a divalent linear or branched alkyl radical which has 2 to 20 carbon atoms and contains at least one secondary amino group and optionally a hydroxyl group and an ether oxygen;
    with the proviso that the composition contains less than 10 mol %, based on the amount of organosilane V2, of organosilanes having epoxy groups, wherein the organosilane V2 is at an organosilane of formula (IIa)

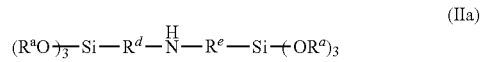
(IIa)

where $R^d$ is a divalent linear or branched alkyl radical which has 2 to 10 carbon atoms and optionally contains a hydroxyl group and an ether oxygen, and
$R^e$ is a divalent linear or branched alkyl radical having 2 to 10 carbon atoms, and
wherein the organosilane V2 is a mixture of:
    an organosilane V2a in which the $R^d$ and $R^e$ radicals in formula (IIa) are both a divalent linear or branched alkyl radical having 2 to 10 carbon atoms; and
    an organosilane V2b in which the $R^e$ radical in formula (IIa) is a divalent linear or branched alkyl radical having 2 to 10 carbon atoms, and $R^d$ radical is a divalent linear or branched alkyl radical having 2 to 10 carbon atoms, and additionally one of the two structural elements shown in formula (IIb),

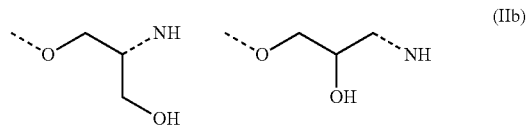
(IIb)

where the organosilanes V2a and V2b mentioned are present in component B in a weight ratio of between 1:2 and 2:1.

2. The two-component silicone composition as claimed in claim 1, wherein the hydroxyl group-terminated polydiorganosiloxane P is a polydiorganosiloxane P' of the formula (I)

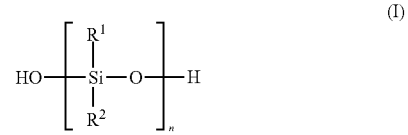
(I)

where
    the $R^1$ and $R^2$ radicals are independently linear or branched, monovalent hydrocarbyl radicals which have 1 to 12 carbon atoms and optionally include one or more heteroatoms, and optionally one or more C—C multiple bonds and/or optionally cycloaliphatic and/or aromatic components; and
    n is chosen such that the weight-average molecular weight $M_w$ of the polydiorganosiloxane P' relative to polystyrene is 500 to 250,000 g/mol.

3. The two-component silicone composition as claimed in claim 2, wherein the hydroxyl group-terminated polydiorganosiloxane P' is a polydiorganosiloxane P1 of the formula (I) where n is chosen such that the weight-average molecular weight $M_w$ of the polydiorganosiloxane P1 relative to polystyrene is 30,000 to 80,000 g/mol; or
    in that the polydiorganosiloxane P' used is a mixture of
    i'') at least one hydroxyl group-terminated polydiorganosiloxane P2 of the formula (I) where n is chosen such that the weight-average molecular weight $M_w$ of the polydiorganosiloxane P2 relative to polystyrene is >80,000 to 250,000 g/mol; and ii") at least one hydroxyl group-terminated polydiorganosiloxane P3 of the formula (I) where n is chosen such that the weight-average molecular weight $M_w$ of the polydiorganosiloxane P3 relative to polystyrene is 500 to ≤80,000 g/mol.

4. The two-component silicone composition as claimed in claim 2, wherein the $R^1$ and $R^2$ radicals are alkyl radicals having 1 to 5 carbon atoms.

5. The two-component silicone composition as claimed in claim 1, wherein organosilane V3 is a silane of the formula (III)

(III)

where the $R^3$ radical is independently a linear or branched, monovalent hydrocarbyl radical which has 1 to 12 carbon atoms and optionally includes one or more heteroatoms, and optionally one or more C—C multiple bonds and/or optionally cycloaliphatic and/or aromatic components;

the $R^4$ radical is an $R^a$ radical; and p has a value of 0 to 4, with the proviso that, if p has a value of 3 or 4, at least p-2 $R_3$ radicals each have at least one group reactive, with the hydroxyl groups of the polydiorganosiloxane P.

6. The two-component silicone composition as claimed in claim 1, wherein the $R^a$ radicals in all organosilanes V1, V2 and V3 is an alkyl radical having 1 to 5 carbon atoms, where portions of these $R^a$ radicals after hydrolysis of Si—$OR^a$ groups may be replaced by hydrogen atoms.

7. The two-component silicone composition as claimed in claim 1, wherein the catalyst K is an organotin compound.

8. The two-component silicone composition as claimed in claim 1, wherein organosilane V2 comprises an organosilane V2a, and in that the catalyst K is present in component B in an amount between 0.1% by weight and 2% by weight, based on component B.

9. The two-component silicone composition as claimed in claim 1, wherein the weight ratio of component A to component B is ≥1:1.

10. A method comprising applying a two-component silicone composition as claimed in claim 1 as adhesive, sealant, coating or as casting compound.

11. A cured silicone composition, wherein it is obtainable from a two-component silicone composition as claimed in claim 1 by mixing component A with component B.

12. A method of adjusting pot life with the same mechanical properties after curing of a two-component silicone composition as claimed in claim 1, wherein the mixing ratio of component A to component B based on weight is selected arbitrarily within the range of component A to component B from 1:1 to 25:1.

13. The two-component silicone composition as claimed in claim 1, wherein the water of component A is part of a water/oil emulsion including 40% to 60% by weight of water, based on the emulsion.

* * * * *